(12) United States Patent
Kim et al.

(10) Patent No.: US 9,242,310 B2
(45) Date of Patent: Jan. 26, 2016

(54) MOBILE TERMINAL AND MANUFACTURING METHOD THEREOF

(75) Inventors: Jeongho Kim, Anyang-si (KR); Anna Yoo, Daegu (KR); Soowook Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 13/327,641

(22) Filed: Dec. 15, 2011

(65) Prior Publication Data

US 2012/0236587 A1 Sep. 20, 2012

(30) Foreign Application Priority Data

Mar. 17, 2011 (KR) ........................ 10-2011-0023704

(51) Int. Cl.
| | |
|---|---|
| B23K 26/06 | (2014.01) |
| B23K 26/26 | (2014.01) |
| B23K 26/32 | (2014.01) |
| C03C 27/06 | (2006.01) |
| F21V 8/00 | (2006.01) |
| H04M 1/22 | (2006.01) |

(52) U.S. Cl.
CPC .......... *B23K 26/063* (2013.01); *B23K 26/0604* (2013.01); *B23K 26/26* (2013.01); *B23K 26/3266* (2013.01); *C03C 27/06* (2013.01); *G02B 6/0026* (2013.01); *B23K 2201/38* (2013.01); *H04M 1/22* (2013.01)

(58) Field of Classification Search
CPC .......... B23K 2201/38; B23K 26/0604; B23K 26/063; B23K 26/26; B23K 26/3266; C03C 27/06; G02B 6/0026; H04M 1/22
See application file for complete search history.

(56) References Cited

U.S. PATENT DOCUMENTS

| | | | |
|---|---|---|---|
| 6,109,994 A | 8/2000 | Cho et al. | |
| 2008/0237540 A1* | 10/2008 | Dubrow ................ | 252/301.6 S |
| 2009/0034292 A1* | 2/2009 | Pokrovskiy et al. ......... | 362/617 |
| 2009/0173424 A1 | 7/2009 | Hasegawa et al. | |
| 2010/0110728 A1 | 5/2010 | Dubrow et al. | |
| 2010/0155749 A1* | 6/2010 | Chen et al. ..................... | 257/89 |
| 2012/0113672 A1* | 5/2012 | Dubrow et al. .............. | 362/602 |
| 2013/0181603 A1* | 7/2013 | Dubrow et al. .............. | 313/512 |

* cited by examiner

*Primary Examiner* — Thomas A Hollweg
(74) *Attorney, Agent, or Firm* — Lee, Hong, Degerman, Kang & Waimey

(57) ABSTRACT

A mobile terminal and manufacturing method thereof are disclosed, by which color reproducibility of a display and the expected life span of a display can be enhanced using quantum dots. The present invention may include a display panel, a plurality of light source units spaced apart from each other, and a quantum dot filter unit provided to a light emitting surface of the light source unit to enable a light provided by the light source unit to pass through. And, the quantum dot filter unit may include a light transmissive hollow pipe member having one end opening or both end openings, quantum dots provided within the light transmissive hollow pipe member, and a sealing member configured to seal the one end opening or the both end openings, the sealing member formed of a same material of the light transmissive hollow pipe member.

17 Claims, 16 Drawing Sheets

MOBILE TERMINAL AND MANUFACTURING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0023704, filed on Mar. 17, 2011, the contents of which are hereby incorporated by reference herein in its entirety.

BACKGROUND OF THE INVENTION

1. Field of the Invention

The present invention relates to a mobile terminal, and more particularly, to a mobile terminal and manufacturing method thereof. Although the present invention is suitable for a wide scope of applications, it is particularly suitable for improving color reproducibility of a display using quantum dots and enhancing the expected life span of the display.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

In order to support and increase functions of the terminal, modification of structural portions and/or software portions thereof may be taken into consideration.

Currently, owing to debut of an AMOLED (Active Matrix Organic Light Emitting Diode), the color gamut (A ratio of accuracy of color reproduction to a recorded picture according to NTSC broadcasting standards) can be improved up to 100%. However, the AMOLED display has problems in that a production cost is high, a lifetime is short due to use of organic RGB materials, and brightness is low.

SUMMARY OF THE INVENTION

Accordingly, the present invention is directed to a mobile terminal and manufacturing method thereof that substantially obviate one or more problems due to limitations and disadvantages of the related art.

An object of the present invention is to provide a mobile terminal and manufacturing method thereof, by which color reproducibility of a display may be improved with a lower manufacturing cost.

Another object of the present invention is to provide a mobile terminal and manufacturing method thereof, by which color reproducibility of a display may be improved using a configuration of a conventional LCD.

A further object of the present invention is to provide a mobile terminal and manufacturing method thereof, by which the expected life span of a display may be enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a display panel, a plurality of light source units spaced apart from each other, and a quantum dot filter unit provided to a light emitting surface of the light source unit to enable a light provided by the light source unit to pass through. And, the quantum dot filter unit may include a light transmissive hollow pipe member having one end opening or both end openings, quantum dots provided within the light transmissive hollow pipe member, and a sealing member configured to seal the one end opening or the both end openings, the sealing member formed of a same material of the light transmissive hollow pipe member.

In another aspect of the present invention, a method of manufacturing a mobile terminal, which includes a display panel, a light source unit and a quantum dot filter unit provided to a light emitting surface of the light source unit, may include a filling step of filling a light transmissive hollow pipe member having one end opening with quantum dots, a sealing step of placing a sealing member formed of a same material of the light transmissive hollow pipe member at the one end opening of the light transmissive hollow pipe member, and a welding step of welding the sealing member and the light transmissive hollow pipe member together to enable an airtight inside of the light transmissive hollow pipe member.

Accordingly, the present invention provides the following effects and/or advantages.

First of all, the present invention may improve color reproducibility of a display with a manufacturing cost lower than that of AMOLED.

Secondly, the present invention may improve color reproducibility of a display using a configuration of a conventional LCD display.

Thirdly, the present invention may enhance the expected life span of quantum points by preventing a quantum point from being penetrated by moisture, air or impurity gas, thereby enhancing the expected life span of a display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The mobile terminal described in the specification can include cellular phone, smart phone, laptop computer, digital broadcasting terminal, PDA (Personal Digital Assistants), PMP (Portable Multimedia Player), navigation and so on. However, it will be apparent of to persons in this field of art that a configuration of the embodiment described in the specification is applicable to stationary terminals, such as digital TV and desk top computer, if cases are excluded, in which the embodiment is applicable only to the mobile terminal.

Figure 1:
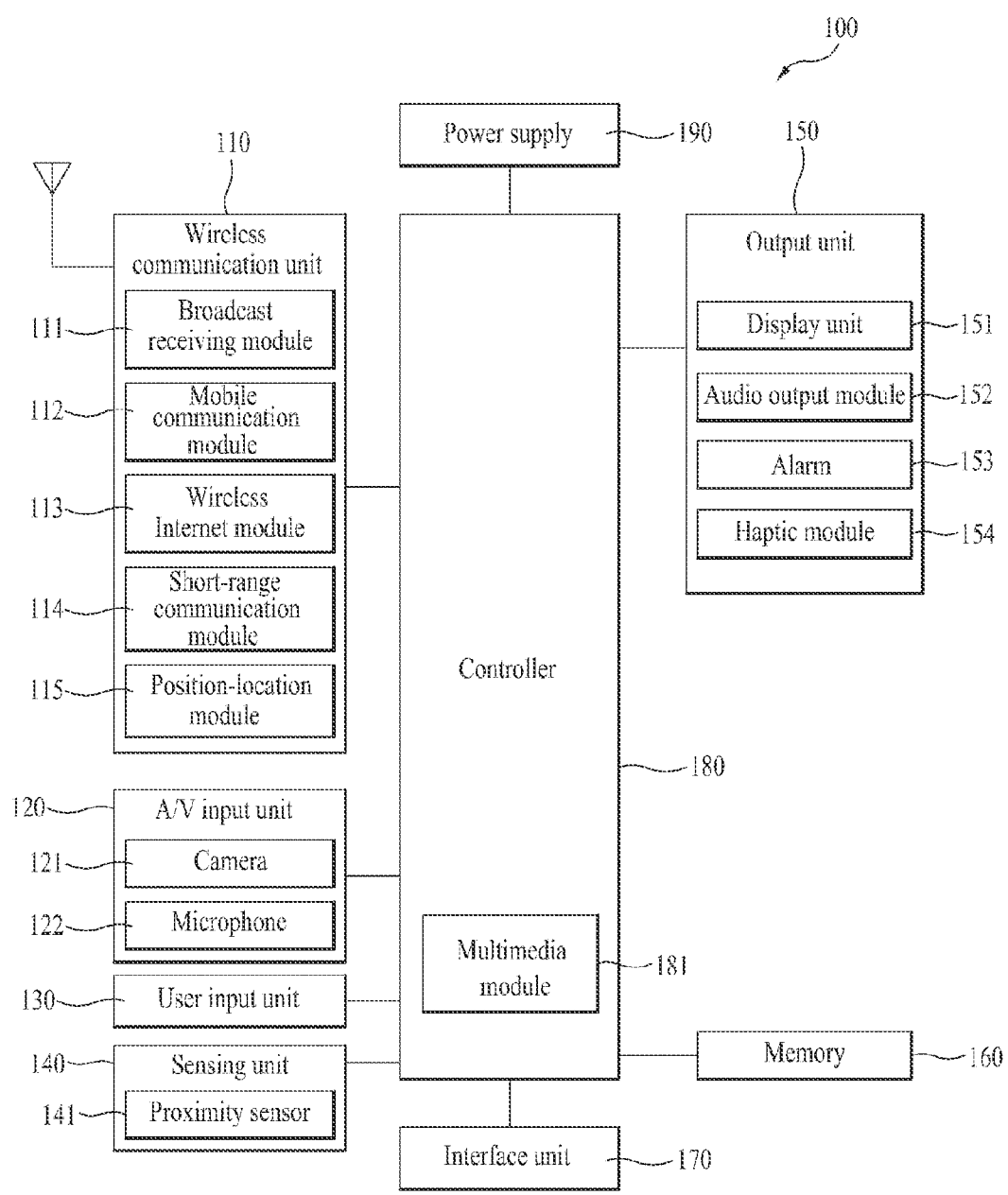
FIG. 1 is a block diagram of a mobile terminal in accordance with an embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Elements of the present invention will be described one by one.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 200.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

The sensing unit 140 detects such a current configuration of the mobile terminal 100 as an open/closed configuration of the mobile terminal 100, a location of the mobile terminal 100, a presence or non-presence of user contact, and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 may include a proximity sensor 141.

The output unit 150 is configured to output an audio signal, a video signal and/or an alarm signal. And, the output unit 150 may include the display 200, an audio output module 152, an alarm output module 153, a haptic module 154 and the like.

The display 200 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 200 may be implemented using known display technologies including, for example, a liquid crystal display (LCD), a thin film transistor-display display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Above structure enables the user to see things positioned in rear of a terminal body through a region of the display unit 200 of the terminal body occupies.

According to an implementation type of the mobile terminal 100, at least two displays 200 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 200 and a sensor for detecting a touch action (hereinafter called 'touch sensor') of such a pointer as a user's finger, a pen and the like configures a mutual layer structure (hereinafter called 'touchscreen'), it is able to use the display 200 as an input device as well as an output device. In this case, the touch sensor can be configured with a touch film, a touch sheet, a touchpad or the like for example.

The touch sensor can be configured to convert a pressure applied to a specific portion of the display 200 or a variation of a capacitance generated from a specific portion of the display 200 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 200 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 200 or the audio output unit 152. Hence, the display 200 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 may include at least one storage medium of such a type as a flash memory type, a hard disk type, a multimedia card micro type, a card type memory (e.g., SD memory, XD memory, etc.), RAM, SRAM (Static Random Access Memory), ROM, EEPROM (Electrically Erasable Programmable Read-Only Memory), PROM (Programmable Read-Only Memory) and the like. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

The power supply 190 receives an external and/or internal power source and then supplies power required for operations of the respective components, under the control of the controller 180.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 2A:
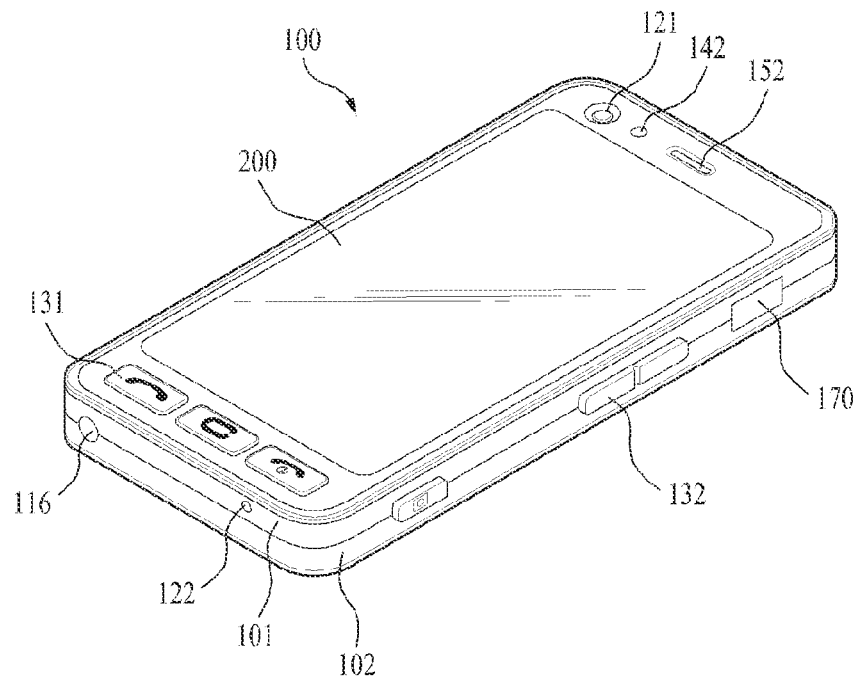
FIG. 2A illustrates a front perspective view of a mobile terminal related to a preferred embodiment of the present invention.

FIG. 2A illustrates a front perspective view of a mobile terminal related to a preferred embodiment of the present invention.

The mobile terminal 100 disclosed herein has a bar type terminal body. However, the present invention is not limited to this, but is applicable to various types of structures of the mobile terminal, such as a slide type, a folder type, a swing type, a swivel type and so on, in which two or more than two bodies are coupled to allow relative motions.

The body includes a case (casing, housing, cover, and so on) which forms an exterior thereof. In the embodiment, the case includes a front case 101 and a rear case 102. Various electronic components are mounted in a space formed between the front case 101 and the rear case 102. There can be at least one intermediate case between the front case 101 and the rear case 102, additionally.

The cases can be injection moldings of synthetic resin or formed of a metal, such as stainless steel or titanium Ti.

The terminal body, mostly the front case 101, can have a display unit 200, a sound output unit 152, a camera 121, user input units 130/131 and 132, a microphone 122, an interface 170 arranged thereon.

The display unit 200 occupies most of a main surface of the front case 101. The sound output unit 152 and the camera 121 are arranged at a region adjacent to one end of the display unit 200 and the user input unit 132 and the microphone 122 are arranged at a region adjacent to the other end of the display unit 200. The user input unit 132 and the interface 170 can be arranged at sides of the front case 101 and the rear case 102.

The user input unit 130, to be handled for receiving an order to control operation of the mobile terminal 100, can include a plurality of handling units 131 and 132. The handling units 131 and 132, called as a handling portion collectively, can be of any type as far as it can be handled in a tactile manner. Contents to be received by the first and second handling units 131 and 132 can be set in a variety of ways. For an example, the first handling unit 131 can receive orders, such as start, end and scroll, and the second handling unit 132 can receive orders such as control of sound volume from the sound output unit 152, and shifting to a touch sensing mode of the display unit 200, and so on.

Figure 2B:
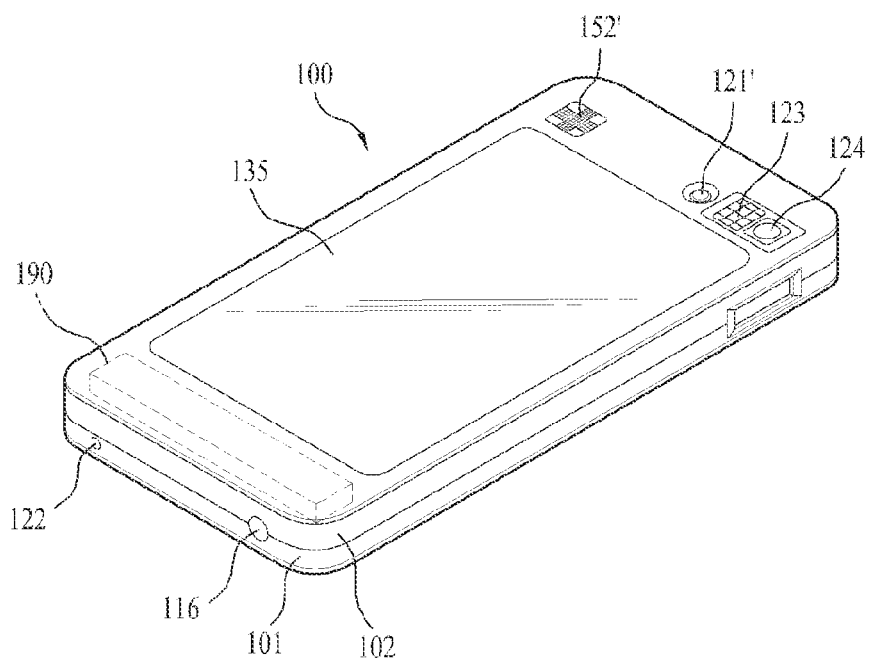
FIG. 2B illustrates a back side perspective view of a mobile terminal related to a preferred embodiment of the present invention.

FIG. 2B illustrates a backside perspective view of a mobile terminal shown in FIG. 2A.

Referring to FIG. 2B, a camera 121' can be mounted to a backside of the terminal body, i.e., on the rear case 102, additionally. The camera 121' has a picture taking direction opposite to the camera 121 (See FIG. 2) actually, and can be a camera having pixels different from the camera 121.

For an example, it is preferable that the camera 121 has low density of pixels such that taking and transmitting a picture of a face of the user to an opposite side can be done properly, and the camera 121' has high density of pixels since there are many cases when the camera 121' takes a general object and stores the picture without transmission directly. The cameras 121 and 121' can be mounted to the terminal body, rotatably or able to pop-up.

A flash 123 and a mirror 124 are arranged adjacent to the camera 121', additionally. The flash 123 illuminates the object when the camera 121' takes the object. The mirror 124 enables the user to see the user's face or so on when the user takes a picture of the user with the user's camera 121'.

A sound output unit 152' can be mounted to the backside of the terminal body, additionally. The sound output unit 152' can implement a stereo function together with the sound output unit 152 (See FIG. 2A), and can be used for implementing a speaker phone mode.

Besides an antenna for communication, the terminal body at a side thereof can have a broadcasting signal reception antenna 124, additionally. The antenna 124 in the broadcast receiving module 111 (See FIG. 1) can be mounted to be able to pull out of the terminal body.

The terminal body has a power supply unit 190 mounted thereto for supplying power to the mobile terminal 100. The power supply unit 190 can be built-in the terminal body or detachably mounted to an outside of the terminal body.

The rear case 102 can have a touch pad 135 mounted thereto additionally for sensing a touch thereto. Alike the display unit 200, the touch pad 135 can also be a light transmission type. In this case, if the display unit 200 is configured to provide visual information to both sides of the display unit 200, the visual information can be sensed through the touch pad 135. All information to be provided to the both sides can be controlled by the touch pad 135. Different from this, a display unit can be mounted to the touch pad 135 additionally, to arrange a touch screen on the rear case 102, too.

The touch pad 135 is operative in relation to the display unit 200 on the front case 101. The touch pad 135 can be arranged in rear of the display unit 200 in parallel thereto. The touch pad 135 can have a size the same or smaller than the display unit 200.

For conveniences' sake, it is assumed that the mobile terminal 100 described below includes at least one of elements shown in FIG. 1. Particularly, the mobile terminal having the present invention applicable thereto includes a display unit 200, a controller 180 for controlling the display unit 200, and a power supply unit 190 for supplying power to the mobile terminal.

Figure 3:
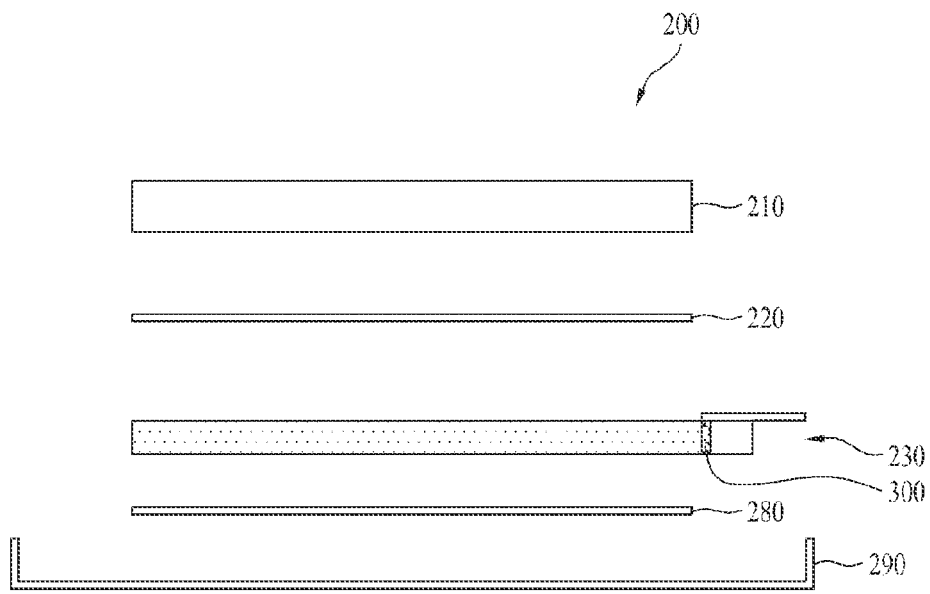
FIG. 3 is a schematic exploded perspective diagram of a display unit in a mobile terminal according to one embodiment of the present invention.

FIG. 3 illustrates an exploded side view of a display unit 200 of a mobile terminal related to a preferred embodiment of the present invention, schematically. Referring to FIG. 3, the display unit 200 includes a display panel 210 (e.g., liquid crystal panel), a diffuser sheet 220 arranged under the display panel 210, a back light unit BLU 230 arranged under the diffuser sheet 220 for providing a light to the display panel 210, a reflector sheet 280 arranged under the back light unit 230 for reflecting the light from the back light unit 230, a frame 290 arranged under the reflector sheet 280 for supporting above elements.

Figure 4:
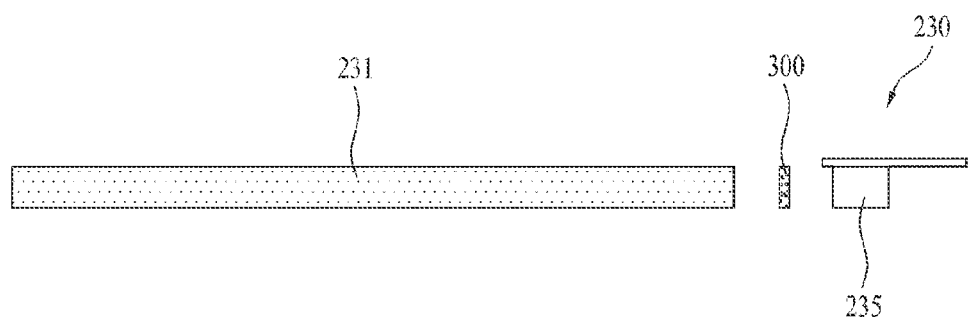
FIG. 4 is a schematic exploded perspective diagram of a backlight unit in a mobile terminal according to one embodiment of the present invention.
Figure 5:
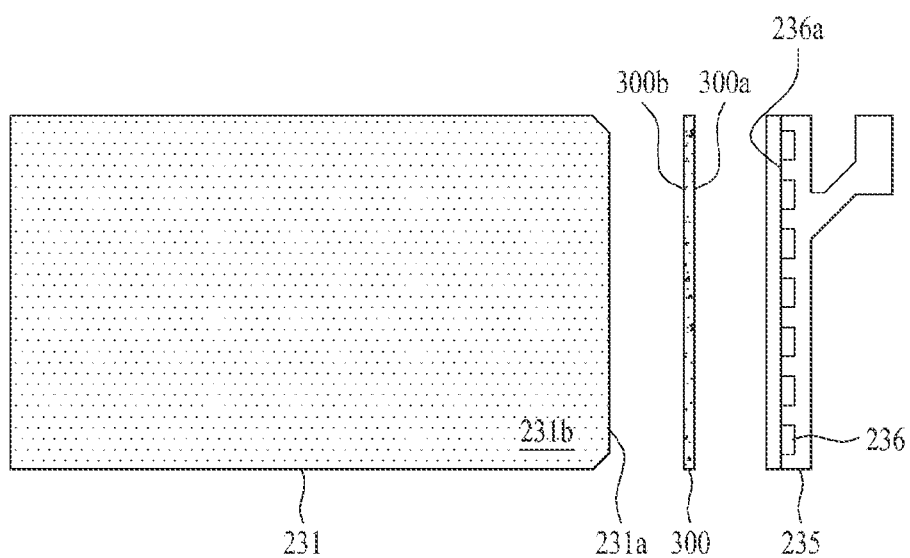
FIG. 5 is a schematic exploded layout of a backlight unit in a mobile terminal according to one embodiment of the present invention.

FIGS. 4 and 5 illustrate the back light unit 230 of the present invention, schematically. In general, in the back light unit 230 of the display panel 210 (i.e., LCD), there are a direct lighting type in which a light source is arranged on an entire rear surface of the display panel 210, and an edge lighting type in which the light source is arranged on an edge of the display panel 210. The back light unit 230 of the present invention is the edge lighting type back light unit which is used in the mobile terminal for reducing a thickness of the display unit 200.

Referring to FIGS. 4 and 5, the back light unit 230 of the present invention includes a light guide plate LGP 231 arranged under the display panel 210, a quantum dot filtering unit 300 arranged at a side of the light guide plate 231, and a light source supporter 235 at a side of the quantum dot filtering unit 300 for supporting a plurality of light source units 236. Preferably, the light guide plate 231, the quantum dot filtering unit 300 and the light source supporter 235 are bonded with light transmissive resin to one another.

Referring to FIG. 5, the light guide plate 231 includes a light incident surface 231a for receiving the light from the light source unit 236, and a light emission surface 231b for emitting the light to the display panel 210, and the light incident surface 231a and the light emission surface 231b are perpendicular to each other. And, in order to maintain uniformity of a screen of the display panel 210, the light guide plate 231 has concentration of a light scattering agent which becomes the heavier as the light guide plate 231 goes from one side thereof close to the light source unit 236 (i.e., a light incident surface side) to the other side thereof spaced from the light guide plate 231 the more for making the light to diffuse at the screen of the display panel 210 uniformly to produce a bright and clear image.

Referring to FIG. 5, the quantum dot filtering unit 300, a filtering unit having quantum dots which are light emission materials filled therein, has a light incident surface 300a for receiving the light from the light source unit 236, and a light emission surface 300b for emitting the light to the light incident surface 231a of the light guide plate 231. The quantum dot in the quantum dot filtering unit 300, which is a nano sized semiconductor material having a quantum confinement effect, has a characteristic of generating a stronger light within a narrow wave length band than a related art light emission material (Refer to FIG. 13).

And, light emission from the quantum dot, which takes place as an excited electron transits from a conduction band to a valence band, has a characteristic in which the wave length varies with a size of particle even in a case of the same material. In detail, because the quantum dot emits a light having a wave length which is the shorter (a blue color group) as a size of the quantum dot becomes the smaller, a light of a desired wave length band can be obtained by controlling the size of the quantum dot. Since the quantum dot emits the light even if an excitation wave length is selected in random, if many kinds of the quantum dots are excited with one wave length, many colors of light can be observed at a time. Moreover, since the quantum dot transits from a ground vibration state of the conduction band to a ground vibration state of the valence band only, almost of the light emitted from the quantum dot is a single color light. Owing to those characteristics of the quantum dot, colors on the display can be made clear, and brightness can also be increased significantly compared to the AMOLED.

Eventually, by using the quantum dot filtering unit 300 having the quantum dots filled therein, the present invention can improve the color gamut more than 100% like the AMOLED even if a production cost is lower than the AMOLED, and can improve the brightness compared to the AMOLED owing to the characteristics of the quantum dot that emits a strong light within a narrow wave length band. A structure and a shape of the quantum dot filtering unit 300 will be described in more detail.

The light source supporter 235 has one side connected to a side of the quantum dot filtering unit 300 (i.e., a side positioned on a light incident surface 300a side of the quantum dot filtering unit 300), and the other side connected to the power supply unit 190. As shown in FIG. 4, the light source supporter 235 contains a plurality of the light source units 236 spaced from one another, and each of the light source units 236 has a light emission surface 236a for emitting a light therefrom. Preferably, the light source unit 236 is an LED device, and more preferably, the light source unit 236 is a blue LED or an UV LED.

The back light unit 230 has the following light emission process. A light is generated at the light source unit 236 which is an LED device, emits from the light incident surface 236a, is incident on the light incident surface 300a of the quantum dot filtering unit 300, is converted into a R light, a G light, and a B light which are strong lights with narrow wave length bands by the quantum dots as the light passes the quantum dot filtering unit 300, emits from the light emission surface 300b of the quantum dot filtering unit 300, and provided to the light incident surface 231a of the light guide plate 231.

Figure 13:
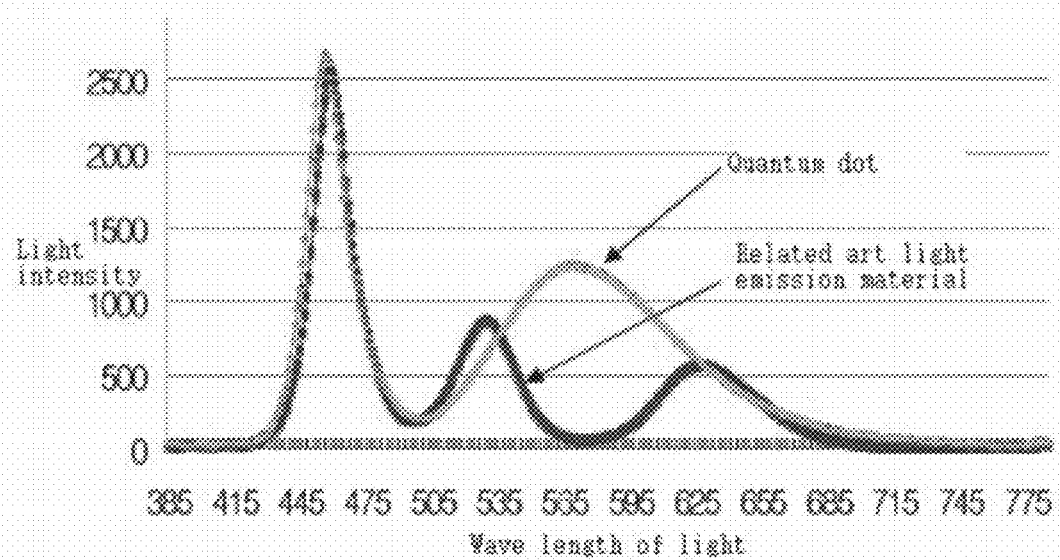
FIG. 13 is a graph representing characteristics of a quantum dot and a related art light emission material.

In the following description, a configuration and manufacturing method of the quantum dot filter unit 300 may be described in detail with reference to FIG. 6 and FIG. 13.

Figure 6:
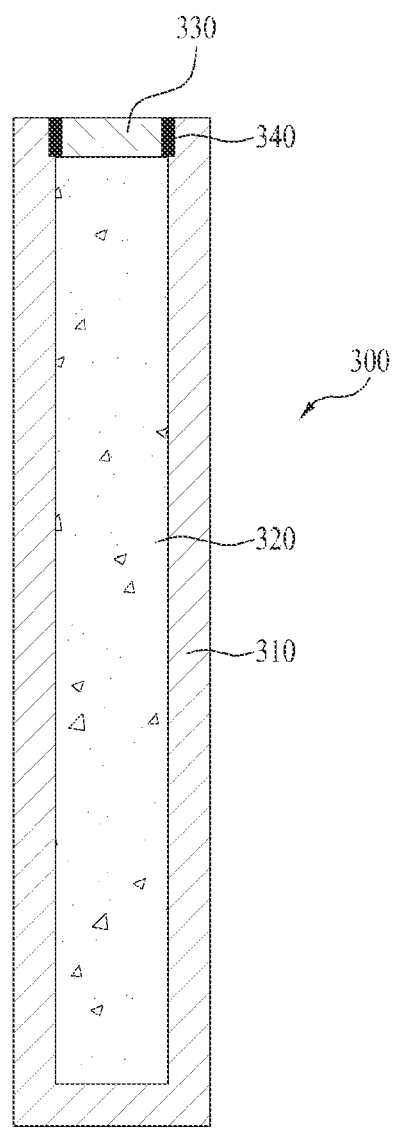
FIG. 6 is a schematic cross-sectional diagram of a quantum dot filter unit according to the present invention.

FIG. 6 is a schematic cross-sectional diagram of a quantum dot filter unit according to the present invention.

Referring to FIG. 6, the quantum dot filter unit 300 may include a light transmissive hollow pipe member 310, a sealing member 330 sealing quantum dots 320, with which the light transmissive hollow pipe member 310 is filled, and one end or both ends of the light transmissive hollow pipe member 310, and a welding part 340 connecting the light transmissive hollow pipe member 310 and the sealing member 330 together airtightly.

In particular, at least one of both of the ends of the light transmissive hollow pipe member 310 may be configured open. In the following description, for clarity and convenience of the following description and to avoid redundant description, assume that one end of the light transmissive hollow pipe member 310 is open only.

The light transmissive hollow pipe member 310 may be formed of light transmissive material to enable light emitted from a light source unit to pass through. Preferably, the light transmissive hollow pipe member 310 may be formed of glass. And, the light transmissive hollow pipe member 310 may be attached to a front side of the light source unit (i.e., a light emitting surface of the light source unit) and a lateral side of a light guide plate (i.e., a light incident surface of the light source unit) with light transmissive resin.

The light transmissive hollow pipe member 310 may be filled with quantum dots 320. As mentioned in the foregoing description, as the light transmissive hollow pipe member 310 is filled with quantum dots 320, it may be able to emit light stronger than that of a conventional backlight unit (BLU) on a narrow wavelength band. Therefore, the light transmissive hollow pipe member 310 may be able to enhance color reproducibility and luminance better that those of a conventional display (e.g., AMOLED display).

In particular, as the quantum dot filter unit 300 is provided to a lateral side of the light source unit 247, it may be able to reduce a manufacturing cost less than that of the AMOLED in a manner of adding the quantum dot filter unit 300 to a conventional edge type backlight unit without modifying the structure and configuration of such a conventional backlight unit as AMOLED. Moreover, it may be able to improve color reproducibility over 100% like AMOLED. And, it may be also able to increase luminance due to the quantum dot property of emitting strong light on a short wavelength band.

The sealing member 330 may be formed of the same material of the light transmissive hollow pipe member 310. For instance, the light transmissive hollow pipe member 310 may be formed of glass and the sealing member 330 may be formed of glass like the light transmissive hollow pipe member 310.

The sealing member 330 and the light transmissive hollow pipe member 310 may be connected together via the welding part 340. In particular, the welding part 340 may include a laser (L) welding part 340.

After the light transmissive hollow pipe member 310 has been filled with the quantum dots 320, the sealing member 330 may seal the light transmissive hollow pipe member 310 with an airtight mechanism to avoid contacting with external oxygen, moisture and the like. After the sealing member 330 has been placed within one end of an opening of the light transmissive hollow pipe member 310, when the sealing member 330 is fixed to the light transmissive hollow pipe member 310, the light transmissive hollow pipe member 310 and the sealing member 330 may be attached together using such an adhesive as a resin (e.g., an epoxy resin, etc.). If so, since interfacial energy between the glass (inorganic) and the adhesive (organic) is too low, it may be difficult for the light transmissive hollow pipe member 310, the adhesive and the sealing member 300 to be strongly attached together. Thus, gaps may be generated between the light transmissive hollow pipe member 310 and the adhesive and/or between the adhesive and the sealing member 330. External moisture, air and the like may penetrate through the gaps, thereby causing a problem that the expected life span of the quantum dots may be shortened.

To solve the above problem, the present invention may connect the light transmissive hollow pipe member 310 and the sealing member 330 formed of the same material of the light transmissive hollow pipe member 310 by means of the welding part 340 (e.g., laser (L) welding part), thereby avoiding the shortened life span of the quantum dots due to the low interfacial energy between the glass and the adhesive. In particular, the present invention adopts the welding part 340 to enable an inside of the quantum dot filter unit 300 to become airtight. Since the quantum dots within the quantum dot filter unit 300 avoid contacting with external moisture, air and the like, the present invention may be able to elongate the expected life span of the quantum dot filter unit 300.

Figure 7A:
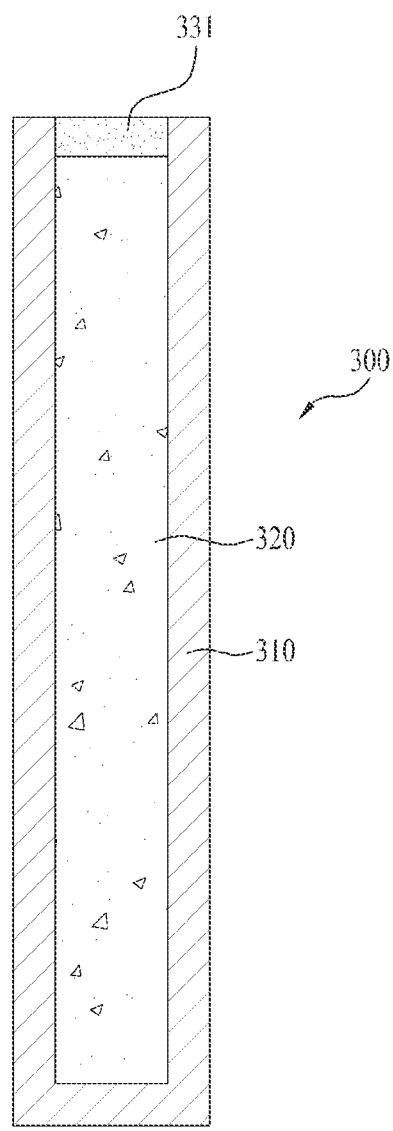
FIG. 7A and FIG. 7B are schematic cross-sectional diagrams of a quantum dot filter unit according to a first embodiment of the present invention.
Figure 7B:
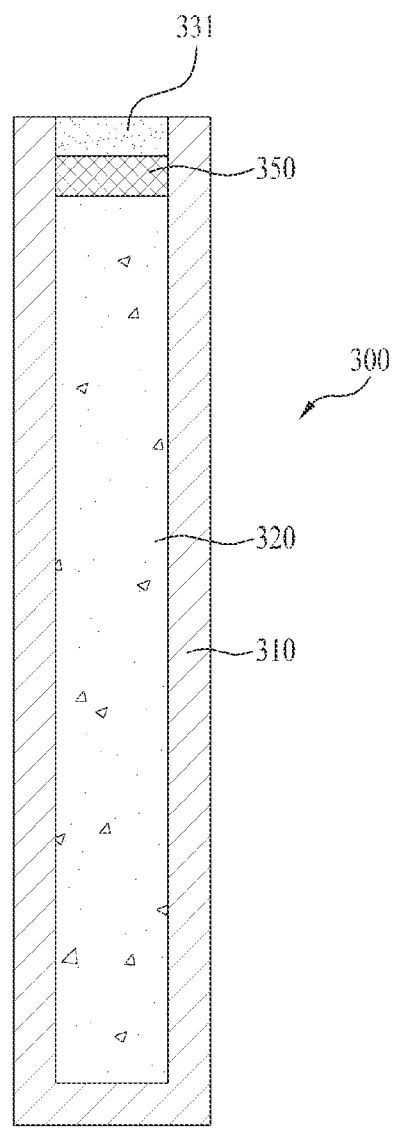

FIG. 7A and FIG. 7B are schematic cross-sectional diagrams of a quantum dot filter unit according to a first embodiment of the present invention.

Referring to FIG. 7A, a quantum dot filter unit 300 according to a first embodiment of the present invention may include a light transmissive hollow pipe member 310 filled with quantum dots 320 and a sealing member 330 sealing one end opening of the light transmissive hollow pipe member 310.

The light transmissive hollow pipe member 310 may be formed of glass. And, the sealing member 330 may be generated from a glass frit 331. In particular, the sealing member 330 may be formed in a following manner. First of all, the glass frit 331 is stacked on the quantum dots 320 with which the light transmissive hollow pipe member 310 is filled. Secondly, the glass frit 331 is melted by a welder (e.g., laser (L) welder) for local welding. Finally, the melt glass frit 331 is then solidified. In doing so, a contact region between the glass frit 331 and the light transmissive hollow pipe member 310 may become the welding part 340. The sealing member 330 and the light transmissive hollow pipe member 310 may be formed of the same material and may be connected together via the welding part 340. Thus, strong adhesive strength may be provided by high interfacial energy thereof. Therefore, the sealing member 330 and the light transmissive hollow pipe member 310 may configure the airtight quantum dot filter unit 300 free from gaps in-between.

Referring to FIG. 7B, the quantum dot filter unit 300 according to the first embodiment of the present invention may further include a getter 350 provided between the sealing member 330 and the quantum dots 320 with which the light transmissive hollow pipe member 310 is filled.

The getter 350 may eliminate impurity gas generated from welding the contact region between the sealing member 330 and the light transmissive hollow pipe member 310 or impurity gas remaining within the airtight quantum dot filter unit 300 and may also be able to further enhance the degree of a vacuum within the quantum dot filter unit 300. The getter 350 may play a role in preventing the expected life span of the quantum dots contained in the quantum dot filter unit 300 from being shortened by the impurity gases, whereby the expected life span of the display unit can be elongated.

The getter 350 may be formed of one of zeolite, Ba, Cao, SrO and the like. Preferably, the getter 350 may be formed of activated carbon.

Figure 8A:
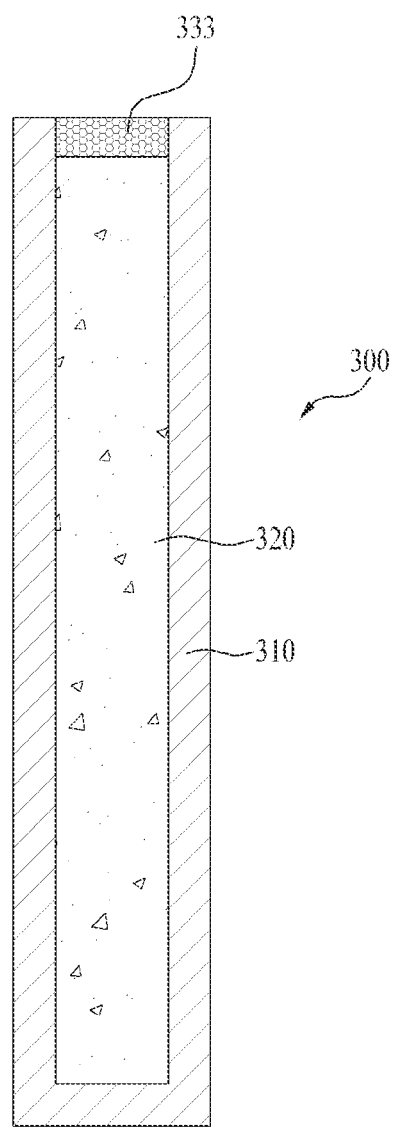
FIG. 8A and FIG. 8B are schematic cross-sectional diagrams of a quantum dot filter unit according to a second embodiment of the present invention.
Figure 8B:
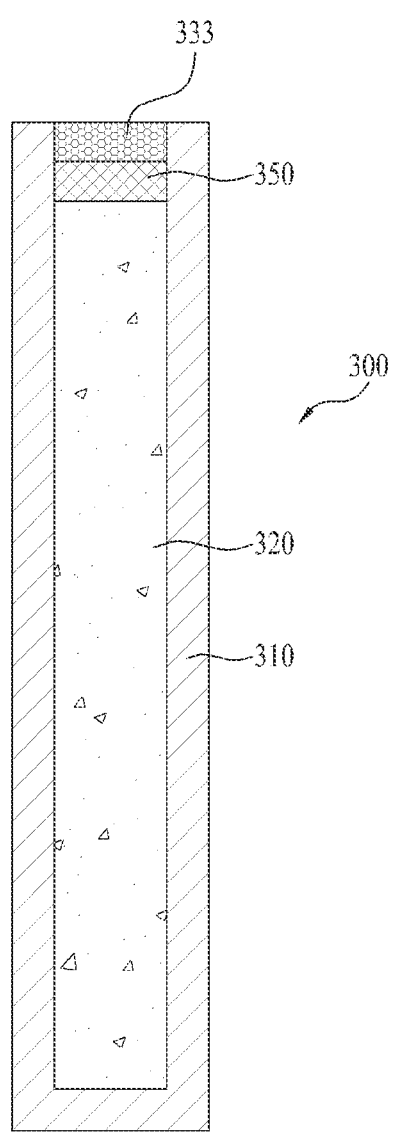

FIG. 8A and FIG. 8B are schematic cross-sectional diagrams of a quantum dot filter unit 300 according to a second embodiment of the present invention.

Referring to FIG. 8A, a quantum dot filter unit 300 according to a second embodiment of the present invention may include a light transmissive hollow pipe member 310 filled with quantum dots 320 and a sealing member 330 sealing one end opening of the light transmissive hollow pipe member 310.

The light transmissive hollow pipe member 310 may be formed of glass. And, the sealing member 330 may be generated from glass beads 333. Preferably, each of the glass beads 330 may have a size ranging 0.1 μm to 60 μm.

In particular, the sealing member 330 may be formed in a following manner. First of all, the glass beads 333 are stacked on the quantum dots 320 with which the light transmissive hollow pipe member 310 is filled. Secondly, the glass beads 333 are melted by a welder (e.g., laser (L) welder) for local welding. Finally, the melt glass beads 333 are then solidified. In doing so, a contact region between the glass beads 333 and the light transmissive hollow pipe member 310 may become the welding part 340. The sealing member 330 and the light transmissive hollow pipe member 310 may be formed of the same material and may be connected together via the welding part 340. Thus, strong adhesive strength may be provided by high interfacial energy thereof. Therefore, the sealing member 330 and the light transmissive hollow pipe member 310 may configure the airtight quantum dot filter unit 300 free from gaps in-between.

Referring to FIG. 8B, the quantum dot filter unit 300 according to the second embodiment of the present invention may further include a getter 350 provided between the sealing member 330 and the quantum dots 320 with which the light transmissive hollow pipe member 310 is filled.

The getter 350 may eliminate impurity gas generated from welding the contact region between the sealing member 330 and the light transmissive hollow pipe member 310 or impurity gas remaining within the airtight quantum dot filter unit 300 and may also be able to further enhance the degree of a vacuum within the quantum dot filter unit 300. The getter 350 may play a role in preventing the expected life span of the quantum dots contained in the quantum dot filter unit 300 from being shortened by the impurity gases, whereby the expected life span of the display unit can be elongated.

The getter 350 may be formed of one of zeolite, Ba, Cao, SrO and the like. Preferably, the getter 350 may be formed of activated carbon.

Figure 9:
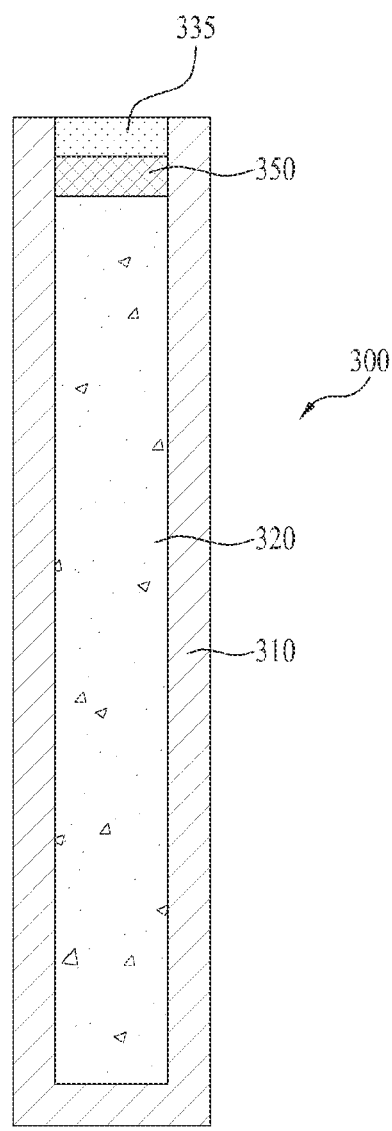
FIG. 9 is a schematic cross-sectional diagram of a quantum dot filter unit according to a third embodiment of the present invention.

FIG. 9 is a schematic cross-sectional diagram of a quantum dot filter unit according to a third embodiment of the present invention.

Referring to FIG. 9, a quantum dot filter unit 300 according to a third embodiment of the present invention may include a light transmissive hollow pipe member 310 filled with quantum dots 320 and a sealing member 330 sealing one end opening of the light transmissive hollow pipe member 310.

The light transmissive hollow pipe member 310 may be formed of glass. And, the sealing member 330 may be formed of silicon powder or silicon dioxide ($SiO_2$) powder.

In particular, the sealing member 330 may be formed in a following manner. First of all, the silicon or silicon dioxide is stacked on the quantum dots 320 with which the light transmissive hollow pipe member 310 is filled. Secondly, the silicon or silicon dioxide is melted by a welder (e.g., laser (L) welder) for local welding. Finally, the melt silicon or the melt silicon dioxide is then solidified. In doing so, a contact region between the light transmissive hollow pipe member 310 and the silicon or the silicon dioxide may become the welding part 340. The sealing member 330 and the light transmissive hollow pipe member 310 may be formed of the same material or the same kind and may be connected together via the welding part 340. Thus, strong adhesive strength may be provided by high interfacial energy thereof. Therefore, the sealing member 330 and the light transmissive hollow pipe member 310 may configure the airtight quantum dot filter unit 300 free from gaps in-between.

Yet, unlike the quantum dot filter unit 300 according to the first or second embodiment of the present invention, in case of the quantum dot filter unit 300 according to the third embodiment of the present invention including the sealing member 330 and the welding part 340 generated from silicon or silicon dioxide, since a melting point difference between the light transmissive hollow pipe member 310 formed of glass and the sealing member 330 formed of light transmissive hollow pipe member 310 is considerably big, a considerable quantity of impurity gas may be generated in the course of melting the silicon powder 335 or the silicon dioxide powder. Therefore, it may be necessary to insert a getter 330 between the sealing member 330 and the quantum dots 320 with which the light transmissive hollow pipe member 310 is filled.

If the getter 350 is inserted, it may be able to prevent the expected life span of the quantum dots from being shortened by the heat transfer to the quantum dots from laser (L) welding due to the melting point difference between the sealing member 330 and the light transmissive hollow pipe member 310. In particular, according to the present embodiment, the getter 350 may play a role as a thermal buffer region.

The getter 350 may eliminate impurity gas generated from welding the contact region between the sealing member 330 and the light transmissive hollow pipe member 310 or impurity gas remaining within the airtight quantum dot filter unit 300 and may also be able to further enhance the degree of a vacuum within the quantum dot filter unit 300. The getter 350 may play a role in preventing the expected life span of the quantum dots contained in the quantum dot filter unit 300 from being shortened by the impurity gases, whereby the expected life span of the display unit can be elongated.

The getter 350 may be formed of one of zeolite, Ba, Cao, SrO and the like. Preferably, the getter 350 may be formed of activated carbon.

Figure 10A:
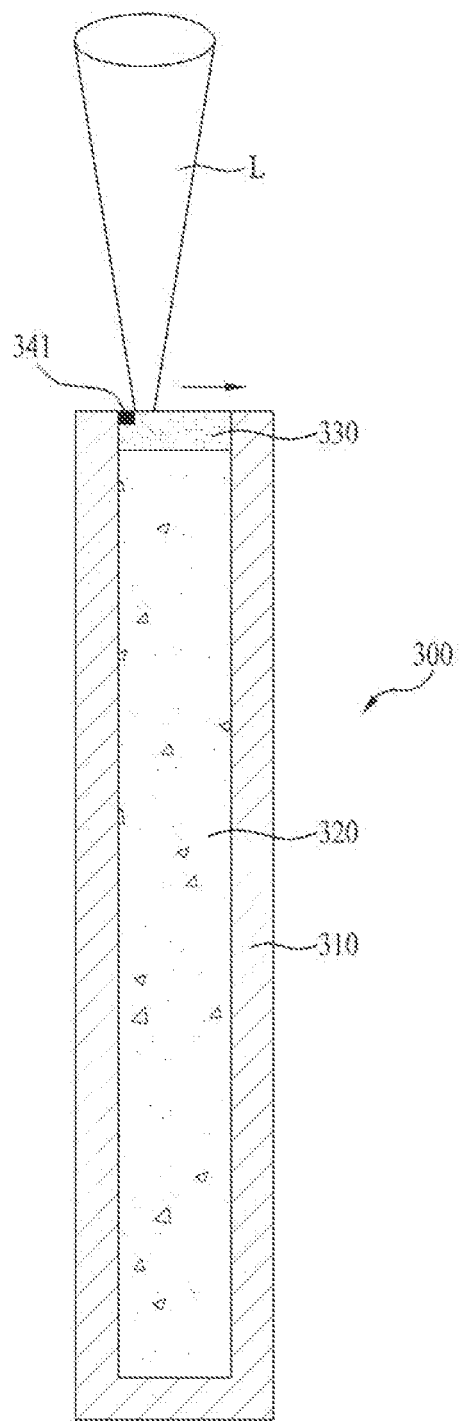
FIGS. 10A to 10C are schematic diagrams of a process for forming a welded part according to a first embodiment of the present invention.
Figure 10B:
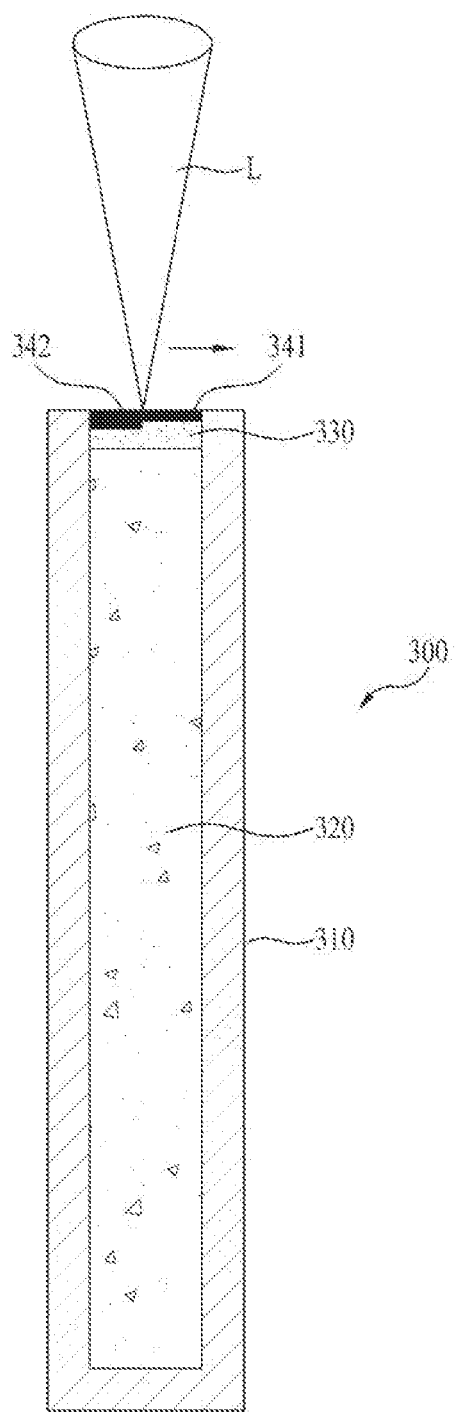
Figure 10C:
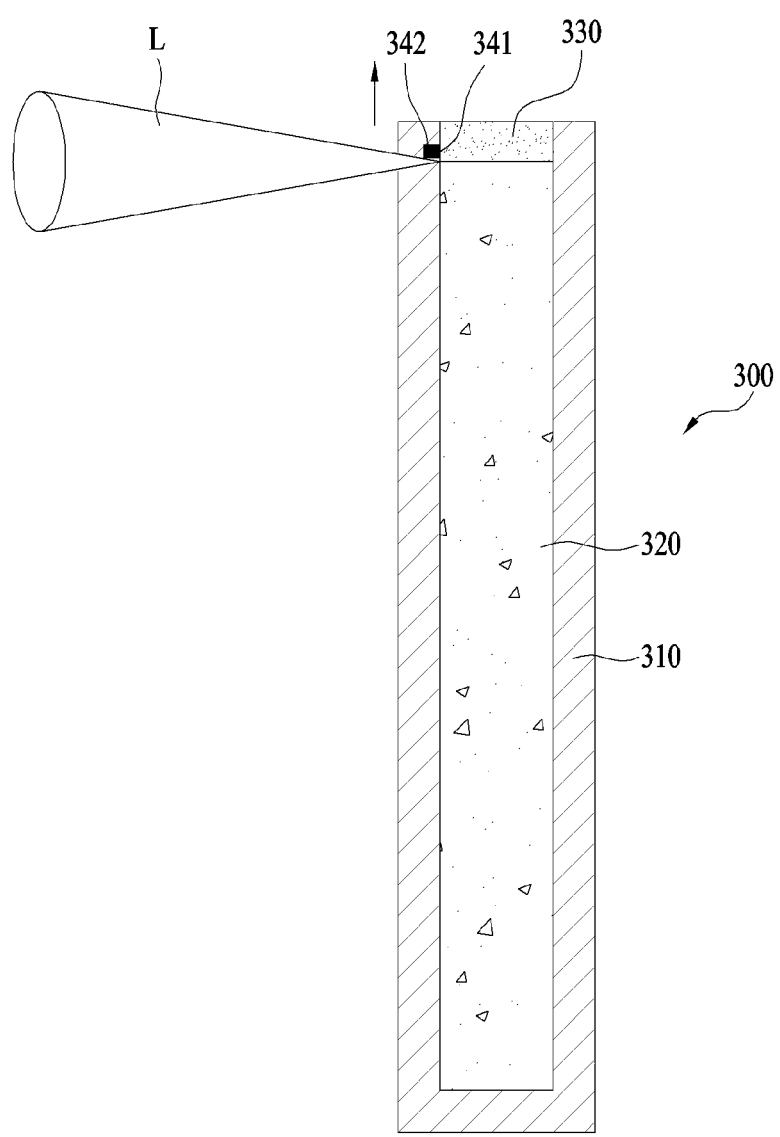

FIGS. 10A to 10C are schematic diagrams of a process for forming a welded part according to a first embodiment of the present invention.

First of all, since a light transmissive hollow pipe member 310 may be formed of glass which has very low thermal conductivity, if glass is welded by a laser (L), heat expansion may be locally generated. Therefore, when the melt glass is cooled down, it may cause a problem that cracks are generated in the light transmissive hollow pipe member 310. To solve this problem, it may be necessary to reduce temperature gradient in the welding region and a peripheral region around the welding region. And, the wending part 340 of the present invention may be formed in a manner of performing a low power laser welding at least once and then performing a high power laser welding at least once.

Preferably, the welding part 340 of the present invention may be formed in a manner of performing a defocused laser welding at least once and then performing a focused laser welding at least once.

In particular, referring to FIG. 10A, a $1^{st}$ welding part 341 may be formed in manner that at least one defocused laser (L) welding may be performed on a free end region (e.g., an externally exposed region or surface of a free end region situated to oppose a contact region between the quantum dots 320 and the sealing member 330) of the sealing member 330 stacked on one end opening of the light transmissive hollow pipe member 310.

Subsequently, referring to FIG. 10B, a $2^{nd}$ welding part 342 may be formed in a manner of performing at least one focused laser (L) welding on the free end region of the sealing member 330 stacked on one end opening of the light transmissive hollow pipe member 310 or the $1^{st}$ welding part 341.

Thus, after the 1st welding part 341 has been formed by performing the defocused laser welding, which generates low welding calories, on the free end region of the sealing member 330, the 2nd welding part 342 may be formed by performing the focused laser welding, which generates high welding calories, on the free end region of the sealing member 330. If so, the temperature gradient in the vicinity of the welding region and the corresponding neighbor region is reduced. Therefore, it may be able to prevent cracks from being generated when the melted light transmissive hollow pipe member 310 and the melted sealing member 330 are cooled or solidified.

Referring to FIG. 10C, the $1^{st}$ welding part 341 and the $2^{nd}$ welding part 342 may be additionally formed at least one of the contact region between the sealing member 330 and the light transmissive hollow pipe member 310 and the region neighbor to the contact region. In doing so, the laser L may be applied in a direction vertical to the contact region between the sealing member 330 and the light transmissive hollow pipe member 310.

In this case, the laser L may include one of IR laser L (e.g., CO2 laser, etc.) and Nd:YAG laser L.

For another example of preventing cracks, the welding part 340 may be formed by a pulse laser L periodically applied for prescribed duration. In this case, the prescribed duration may be preferably equal to or smaller than 1 ps. Thus, if the welding part 340 is formed using the pulse laser L, it may be able to reduce thermal stress generated from the light transmissive hollow pipe member 310 formed of glass and the sealing member 330 formed of glass or the same kind. Therefore, it may be able to prevent cracks.

Figure 11:
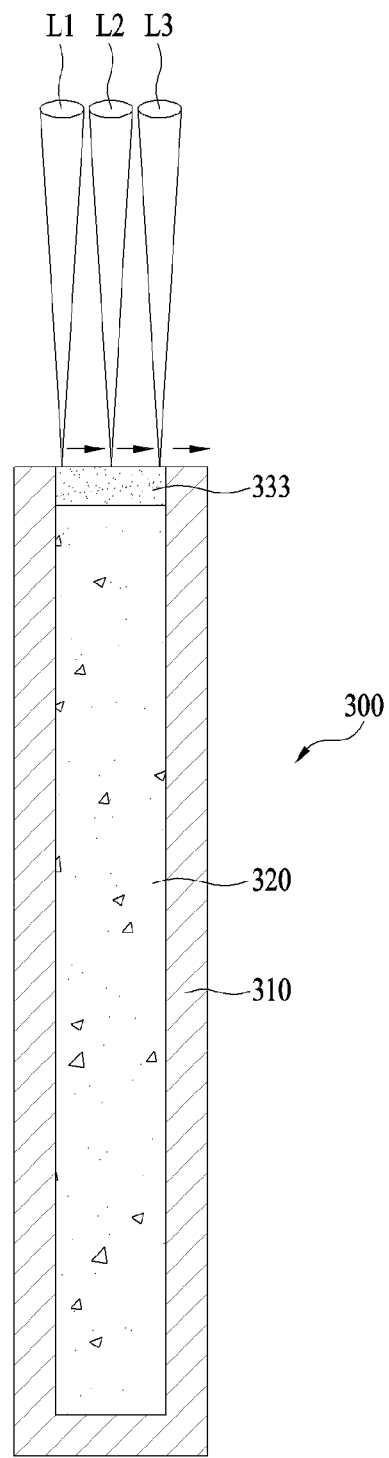
FIG. 11 is a schematic diagram of a process for forming a welded part according to a second embodiment of the present invention.

FIG. 11 is a schematic diagram of a process for forming a welded part according to a second embodiment of the present invention.

First of all, according to the second embodiment for forming a welding part 340, in order to reduce a temperature gradient in a welding region and a region neighbor to the welding region, the welding part 340 may be welded by a plurality of lasers L applied simultaneously.

In particular, referring to FIG. 11, a welding part 340 may be formed in manner that a plurality of lasers L are applied to a whole free end region (e.g., an externally exposed region or surface of a free end region situated to oppose a contact region between the quantum dots 320 and the sealing member 330) of the sealing member 330 stacked on one end opening of the light transmissive hollow pipe member 310. For instance, $1^{st}$ to $3^{rd}$ lasers L1 to L3 may be simultaneously applied to the free end region of the sealing member 330 and one surface of the light transmissive hollow pipe member 310 in the same plane of the free end region at least once and may be then shifted in a direction of a region to which the lasers are not applied yet. Therefore, as the welding calories are generated from the whole welding region, it may be able to considerably reduce the temperature gradient due to the laser welding in the sealing member 330 and the light transmissive hollow pipe member 310.

As mentioned in the foregoing description of the first embodiment, the 1$^{st}$ to 3$^{rd}$ lasers L1 to L3 may include a defocused laser L for the 1$^{st}$ welding part 341 and the focused laser L for the 2$^{nd}$ welding part 342.

Moreover, each of the 1$^{st}$ to 3$^{rd}$ lasers L1 to L3 may include a pulse laser L.

FIGS. 12(a) to 12(f) are sequential diagrams of a process for manufacturing a quantum point filter unit in a mobile terminal according to the present invention.

Figure 12:
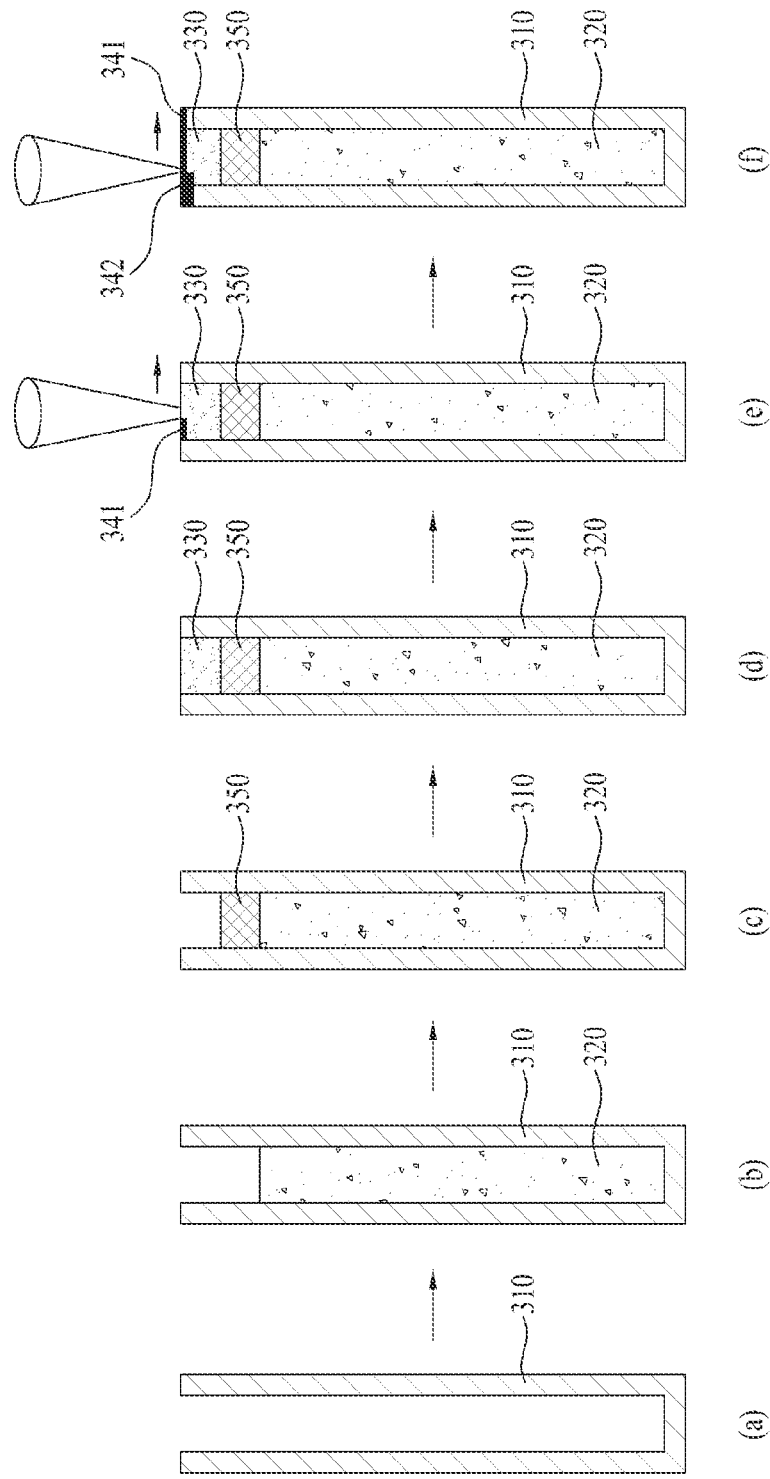
FIGS. 12A to 12F are sequential diagrams of a process for manufacturing a quantum point filter unit in a mobile terminal according to the present invention.

Referring to FIG. 12(a), a light transmissive hollow pipe member 310 having one end opening is fabricated by casting or the like. In doing so, particles and/or impurities may be eliminated from a surface of the light transmissive hollow pipe member 310 using ultrasonic waves or organic solvent.

Referring to FIG. 12(b), the light transmissive hollow pipe member 310 having one end opening may be filled with quantum dots 320. In doing so, in order to fill the light transmissive hollow pipe member 310 with the quantum dots 320, capillary or vacuum suction may be used.

Referring to FIG. 12(c), it may be able to optionally arrange a getter 350, which may be formed of one of zeolite, Ba, Zr, CaO and SrO, in the light transmissive hollow pipe member 310 filled with the quantum dots 320.

Referring to FIG. 12(d), a sealing member 330 may be then placed in the one end opening of the light transmissive hollow pipe member 310 filled with the quantum dots 320 or both of the quantum dots 320 and the getter 350. In this case, the sealing member 330 may be formed of one of a glass frit 331, glass beads 333, a silicon powder 335, a silicon dioxide powder 335 and the like. And, one of the materials may be formed by melting and solidification (i.e., welding), which may be described in the followings.

Referring to FIG. 12(e) and FIG. 12(f), the sealing member 330 and the light transmissive hollow pipe member 310 may be welded together to enable an airtight inside of the light transmissive hollow pipe member 310.

In particular, the welding process may include a side welding step of forming a side welding part 340 of the sealing member 330 by applying a laser L in a direction vertical to the contact region between the sealing member 330 and the light transmissive hollow pipe member 310 and a front welding step of forming a front welding part 340 of the sealing member 330 by applying a laser L in a direction vertical to a surface of the free end of the sealing member 330.

In doing so, preferably, in order to prevent cracks from being generated in the light transmissive hollow pipe member 310, the welding process may be performed in a following manner. First of all, a 1$^{st}$ welding part 341 may be formed by performing at least one welding on at least one of the contact region between the sealing member 330 and the light transmissive hollow pipe member 310, a region neighbor to the contact region and the free end region situated to oppose the contact region between the quantum dots 320 and the sealing member 330 using a defocused laser L. Secondly, a 2$^{nd}$ welding part 342 may be then formed by performing at least one welding on the at least one region using a focused laser L.

According to one modified embodiment of the welding process to prevent the cracks from being generated in the light transmissive hollow pipe member 310, the welding process may include the step of performing at least one welding using a plurality of lasers L simultaneously applied to at least one of the contact region between the sealing member 330 and the light transmissive hollow pipe member 310, the region neighbor to the contact region and the free end region situated to oppose the contact region between the quantum dots 320 and the sealing member 330.

According to another modified embodiment of the welding process to prevent the cracks from being generated in the light transmissive hollow pipe member 310, the welding process may include the step of performing at least one welding on at least one of the contact region between the sealing member 330 and the light transmissive hollow pipe member 310, the region neighbor to the contact region and the free end region situated to oppose the contact region between the quantum dots and the sealing member 330 using a pulse laser L.

The above-described mobile terminal 100 above may be applicable, not limited to the configuration and method described in the embodiments, but to some or entire combinations of the embodiments such that various modifications are made available.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display unit for mobile terminal, the display unit comprising:
   a display panel;
   a light source unit configured to output light; and
   a quantum dot filter unit located adjacent to the light source unit such that the output light passes through the quantum dot filter unit,
   the quantum dot filter unit comprising:
      a light transmissive pipe member shaped to define one end opening;
      quantum dots disposed within the light transmissive pipe member;
      a sealing member positioned inside the one end opening and configured to seal the one end opening; and
      a laser welding part comprising a contact region, a neighbor region adjacent to the contact region, and a free end region,
      wherein the contact region is formed by defocused laser welding, which generates low welding heat, performed on the free end region, and the neighbor region is formed by focused laser welding, which generates high welding heat, performed on the free end region such that temperature gradient in the laser welding part and a peripheral region around the laser welding part is reduced, thereby preventing generation of cracks in the light transmissive pipe member,
      wherein the contact region is formed between the sealing member and the light transmissive pipe member for connecting the light transmissive pipe member and the sealing member together such that inside of the quantum dot filter unit is kept airtight,
   and the free end region is defined as an externally exposed surface of the sealing member.

2. The display unit of claim 1, further comprising:
   a light guide plate defined under the display panel,
   wherein the output light is incident on a lateral side of the light guide plate via the quantum dot filter unit.

3. The display unit of claim 2, wherein the light source unit, the quantum dot filter unit and the light guide plate are arranged in series along a same axis.

4. The display unit of claim 3, wherein the quantum dot filter unit is positioned between the light source unit and the light guide plate.

5. The display unit of claim 2, wherein the light guide plate comprises:
- a light incident surface for receiving the light from the light source unit; and
- a light emission surface for emitting the light to the display panel, and wherein the light incident surface and the light emission surface are perpendicular to each other.

6. The display unit of claim 1, wherein the light transmissive pipe member and the sealing member are formed of glass.

7. The display unit of claim 1, wherein the light transmissive pipe member is formed of glass and the sealing member is formed by melting and solidifying a glass frit, a glass bead, silicon powder, or silicon dioxide ($SiO_2$) powder.

8. The display unit of claim 7, further comprising:
- a getter defined between the sealing member and the quantum dots.

9. The display unit of claim 1, further comprising:
- a getter defined between the sealing member and the quantum dots.

10. The display unit of claim 1, wherein the laser welding part is formed by welding with a low-power laser and then welding with a high-power laser.

11. The display unit of claim 10, wherein the low-power laser and the high-power laser are $CO_2$ lasers or Nd:YAG lasers.

12. The display unit of claim 1, wherein the defocused laser and the focused laser are $CO_2$ lasers or Nd:YAG lasers.

13. The display unit of claim 1, wherein the laser welding part is formed by welding with a plurality of simultaneously applied lasers.

14. The display unit of claim 13, wherein the plurality of simultaneously applied lasers are $CO_2$ lasers or Nd:YAG lasers.

15. The display unit of claim 1, wherein the laser welding part is formed by welding with a pulse laser applied for a prescribed duration.

16. The display unit of claim 15, wherein the pulse laser is a $CO_2$ laser or a Nd:YAG laser.

17. The display unit of claim 1, wherein the laser welding part is formed from a welding material that is placed between the light transmissive pipe member and the sealing member and then solidified.

* * * * *